July 1, 1924.
W. N. STEVENS
MIXING MACHINE
Filed Feb. 15, 1921
1,499,890
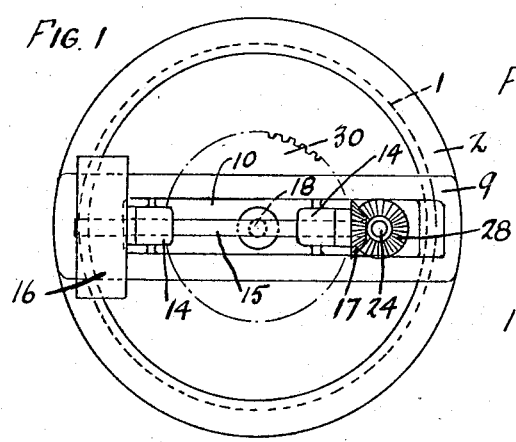
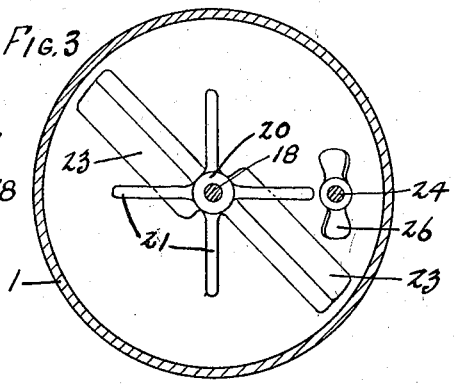
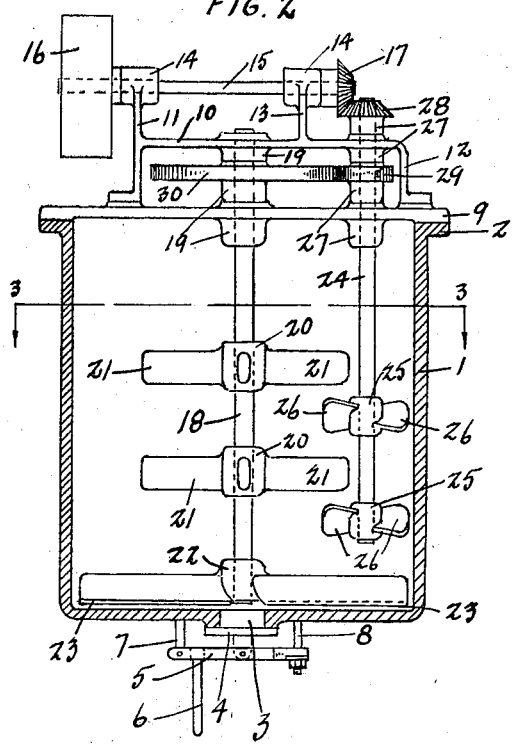
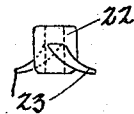
INVENTOR
William N. Stevens
BY
Townsend & Decker
ATTORNEYS.

Patented July 1, 1924.

1,499,890

UNITED STATES PATENT OFFICE.

WILLIAM N. STEVENS, OF NEW YORK, N. Y., ASSIGNOR TO STEVENS-AYLSWORTH COMPANY, OF NEW YORK, N. Y., A CORPORATION OF NEW YORK.

MIXING MACHINE.

Application filed February 15, 1921. Serial No. 445,136.

*To all whom it may concern:*

Be it known that I, WILLIAM N. STEVENS, a citizen of the United States, and a resident of New York, in the county of New York and State of New York, have invented certain new and useful Improvements in Mixing Machines, of which the following is a specification.

My invention relates to machines adapted to mix together different materials, either solids or liquids.

The principal object of the invention is the production of a novel, simple, compact and inexpensive mixing machine by means of which different materials may be thoroughly mixed in a minimum of time.

Other and further objects and advantages of the invention will appear from the accompanying description, the invention consisting in the novel parts and combinations of the same hereinafter more particularly described and then specified in the claims.

In accordance with my invention, briefly stated, the materials to be mixed are placed in a suitable mixing chamber or container and the materials given a rotary motion about the center of the chamber while simultaneously giving the materials a violent vertical motion preferably at an appreciably greater rate than the rotary motion, thus bringing all parts of the materials into contact with all other parts whereby the desired complete mixture thereof is expeditiously effected.

The invention moreover, although it is not to be so limited, is also adapted for use in the case of the mixing of chemicals when one of the ingredients is a solid and the other a liquid and the solid has an appreciably heavier specific gravity than the liquid as in the case, for instance, of the mixing of iron filings with a liquid. In cases of this character it is very desirable to keep the solids as much as possible in suspension in the liquid and it is therefore necessary to plow up the heavier materials from off the bottom of the mixing chamber. In this embodiment of the invention I employ a rotary plow located adjacent the bottom of the chamber which plows up the heavier materials from off the bottom of the chamber and breaks up any tendency of said heavier materials to stay at rest on said bottom. It is only necessary, however, to use the plow when the heavier materials are so heavy that they rest on the bottom of the chamber and the combined rotary and vertical movement of the liquid in the chamber will not disturb them.

In the accompanying drawing showing a practical embodiment of the invention:

Fig. 1 is a top plan view of my improved mixing chamber.

Fig. 2 is a side elevation thereof, the wall of the chamber being shown in section.

Fig. 3 is a horizontal section on the line 3—3 of Fig. 2.

Fig. 4 is an end elevation of the plow.

Referring in detail to the drawing:

1 indicates the mixing chamber or container which in the specific embodiment of the invention shown is a cylinder provided with an upper rim 2. Said chamber is provided with a port 3 in the bottom thereof whereby the contents may be easily drawn therefrom when so desired. Said port may be closed by a valve or other suitable closure 4 pivoted to an operating bar 5 provided with a handle 6. Said operating bar is pivoted at one end to a post 7 which is fastened to the underside of the chamber while the other end receives therethrough a post 8 which is likewise fastened to the underside of the chamber. The end of the post 8 carries a nut as illustrated, whereby the degree of opening of the closure 4 may be varied as is obvious.

9 indicates a cross-strip which may be fastened to the rim 2 in any desirable manner. A horizontal support 10 is provided with vertical arms 11 and 12 which are secured to said cross-strip 9. Said support is also provided with an upwardly-extending arm 13. The upper end of the arm 11 and the arm 13 carry suitable bearings 14 receiving a driving shaft 15 journalled therein. 16 indicates a pulley mounted on one end of said shaft 15 and 17 indicates a bevel gear mounted on the other end thereof. Said pulley 16 may be connected by a belt (not shown) with a suitable source of driving power for effecting a rotation of the shaft 15.

A vertical shaft 18 extends downwardly through the chamber and centrally thereof, its lower end terminating immediately adjacent the bottom of said chamber. The upper end of said shaft 18 extends through said cross-strip 9 and horizontal support 10 and is journalled in suitable bearings 19 carried thereby. 20 indicates the hubs of paddles secured to said shaft 18, the arms 21 of which extend at right-angles outwardly from said shaft. On the lower end of said shaft 18 there may be secured a plow 22 provided with radial blades 23 extending downwardly and outwardly to points adjacent the side walls of said chamber and having a configuration such as illustrated for example in Fig. 4.

A vertical propeller shaft 24 extends downwardly through the chamber adjacent the wall thereof and carries thereon the propellers 25 provided with the inclined blades 26, said propellers being preferably positioned in staggered relation to the position of the paddles 20, it being noted that the blades of the propellers and paddles are so disposed that ample clearance will be provided between the same. Said shaft 24 extends through the cross-strip 9 and support 10 and is journalled in suitable bearings 27 carried thereby. 28 indicates a bevel gear on the end of said shaft 24 which bevel gear meshes with the bevel gear 17.

29 indicates a small gear carried by the shaft 24 and 30 indicates an appreciably larger gear carried by the shaft 18 and meshing with said gear 29. The size of said gears is such that the shaft 24 rotates at least three or four times as fast as the shaft 18 upon rotation of the pulley 16, motion being transmitted through said pulley and shaft 15, bevel gears 17 and 28, shaft 24 and shaft 18 through gears 29 and 30.

When the chamber 1 is filled with the materials to be mixed, for instance, iron filings and a liquid, and the machine set in operation the radial blades 23 of the plow will plow or force the iron filings from the bottom of the chamber and direct them upwardly. In the embodiment illustrated the arms 21 of the paddles will give the whole mass of materials in the chamber a purely axial motion around the shaft 18 thus bringing all parts of the materials under the influence of the propellers 25, the blades of which effect a longitudinal movement of the materials at right angles to the movement given by the paddle arms, which is particularly effective due to the eccentric disposition of the propeller or secondary shaft with respect to the shaft 18. Inasmuch as the rate of the rotation of the shaft 24 is appreciably greater than that of the shaft 18 the materials will be vigorously thrown or directed in a vertical direction by the propeller blades from the bottom of the chamber up to the top or vice versa as the case may be. It will thus be apparent that the movement given to the materials as described will act to effectively and completely mix the same within the chamber.

What I claim as my invention is:—

1. In a mixing machine, a chamber adapted to hold the materials to be mixed, a shaft extending downwardly through said chamber, outwardly extending arms secured to said shaft for giving the materials a rotary motion around said shaft only, a propeller shaft extending downwardly through said chamber and a propeller secured to said propeller shaft for giving said materials a vertical motion longitudinally of said propeller shaft only.

2. In a mixing machine, a chamber adapted to hold the materials to be mixed, a shaft extending downwardly through said chamber and provided with outwardly extending arms secured thereto for rotating the materials around said shaft and a propeller shaft geared to said first-named shaft and extending downwardly through said chamber and carrying a propeller thereon and adapted to be rotated simultaneously with but at a relatively greater speed than said first-named shaft to give said materials a vertical movement.

3. In a mixing machine, a chamber adapted to hold the materials to be mixed, a shaft extending downwardly through said chamber and provided with outwardly extending arms secured thereto for rotating the materials around said shaft only, a plow secured to the lower end of said shaft, radial curved blades forming a part of said plow and extending to points adjacent the side walls of said chamber and a propeller shaft extending downwardly through said chamber and carrying a propeller thereon to give said materials a vertical movement only.

4. In a mixing machine, a chamber adapted to hold the materials to be mixed, a vertical shaft extending downwardly through said chamber and centrally thereof and provided with arms extending outwardly therefrom and at right-angles thereto for rotating the materials around said shaft and a vertical propeller shaft extending downwardly through said chamber adjacent a wall thereof and provided with inclined blades secured thereto.

5. In a mixing machine, a chamber adapted to hold the materials to be mixed, a vertical shaft extending downwardly through said chamber and centrally thereof and provided with arms extending outwardly and at right-angles thereto for rotating the materials around said shaft, a plow secured to the lower end of said shaft adjacent the bottom of said chamber, radial blades forming a part of said plow and extending to points adjacent the side walls of said chamber and a vertical propeller shaft extending downwardly through said chamber adjacent a wall thereof and provided with inclined blades secured thereto whereby said materials are given a vertical movement.

6. In a mixing machine, a chamber adapted to hold the materials to be mixed, a support thereon, a driving shaft journalled in said support, a shaft extending downwardly through said chamber and provided with arms extending outwardly therefrom for rotating the materials around said shaft, a large gear carried by said downwardly extending shaft, a propeller shaft extending within said chamber and geared to said driving shaft and carrying a propeller thereon and a small gear carried by said propeller shaft and meshing with said large gear whereby said propeller will rotate at an appreciably greater speed than said downwardly extending shaft upon rotation of said driving shaft and will give said materials a vertical movement.

7. In a mixing machine, a chamber adapted to hold the materials to be mixed and provided with a port in the bottom thereof, an adjustable valve for said port, a support on said chamber, a driving shaft journalled in said support, a vertical shaft extending downwardly through said chamber and centrally thereof and provided with arms extending outwardly and at right-angles thereto, a plow secured to the lower end of said downwardly extending shaft adjacent the bottom of said chamber and provided with radial blades thereon, a large gear carried by said downwardly extending shaft, a vertical propeller shaft extending within said chamber adjacent a wall thereof and geared to said driving shaft and carrying a propeller thereon and a small gear carried by said propeller shaft and meshing with said large gear whereby said propeller shaft will rotate at an appreciably greater speed than said downwardly extending shaft when said driving shaft is rotated.

8. In a mixing machine, a chamber adapted to receive a mass of material, a shaft extending centrally through said chamber, paddles secured to said shaft, said paddles acting to impart an axial movement to said mass of material only and means eccentrically disposed with respect to said shaft for acting upon said material to move the same longitudinally of said shaft only.

9. In a mixing machine, a chamber, a shaft extending within said chamber, paddles secured to said shaft and adapted to axially move a mass of material within said chamber, a second shaft eccentrically disposed with respect to said first named shaft, propellers attached to said second shaft and adapted, when the latter is rotating, to act upon said material to force the same in a direction longitudinally of said shafts, said paddles and propellers being disposed in staggered relation with respect to each other and having their blades spaced from one another.

Signed at New York, in the county of New York and State of New York, this 14th day of February A. D. 1921.

WILLIAM N. STEVENS.

Witnesses:
F. B. TOWNSEND,
GEORGE E. BROWN.